(12) United States Patent
Zhu et al.

(10) Patent No.: US 7,924,698 B2
(45) Date of Patent: Apr. 12, 2011

(54) PROPORTIONAL FAIR SCHEDULER FOR OFDMA WIRELESS SYSTEMS

(75) Inventors: Chenxi Zhu, Gaithersburg, MD (US); Jonathan Russell Agre, Brinklow, MD (US)

(73) Assignee: Fujitsu Limited, Kawasaki (JP)

( * ) Notice: Subject to any disclaimer, the term of this patent is extended or adjusted under 35 U.S.C. 154(b) by 697 days.

(21) Appl. No.: 11/785,893

(22) Filed: Apr. 20, 2007

(65) Prior Publication Data

US 2007/0248178 A1 Oct. 25, 2007

Related U.S. Application Data

(60) Provisional application No. 60/793,629, filed on Apr. 21, 2006.

(51) Int. Cl.
*H04B 7/212* (2006.01)
(52) U.S. Cl. .......... 370/208; 370/329; 370/431
(58) Field of Classification Search .......... 370/208, 370/329, 431
See application file for complete search history.

(56) References Cited

U.S. PATENT DOCUMENTS

| | | | | |
|---|---|---|---|---|
| 6,278,701 | B1 * | 8/2001 | Ayyagari et al. | 370/335 |
| 7,002,920 | B1 * | 2/2006 | Ayyagari et al. | 370/252 |
| 7,249,941 | B2 * | 7/2007 | Karasawa | 425/174.4 |
| 7,385,915 | B2 * | 6/2008 | Stolpman et al. | 370/208 |
| 2003/0028898 | A1 * | 2/2003 | Howald | 725/129 |
| 2004/0042556 | A1 * | 3/2004 | Medvedev et al. | 375/260 |
| 2004/0095907 | A1 * | 5/2004 | Agee et al. | 370/334 |
| 2006/0056282 | A1 * | 3/2006 | Das et al. | 370/208 |

OTHER PUBLICATIONS

Wikipedia entry Lagrange Multiplier Mar. 17, 2006.*

* cited by examiner

*Primary Examiner* — Daniel J Ryman
*Assistant Examiner* — Jay P Patel
(74) *Attorney, Agent, or Firm* — Staas & Halsey LLP

(57) ABSTRACT

A scheduler and a method schedule available power and bandwidth to users. Equations for a continuous bandwidth allocation of a total bandwidth, and/or a continuous power distribution of a total power, are set up using Lagrangian multipliers to include constraints in a function that is maximum when a fair capacity is maximum. The continuous bandwidth allocation and/or the continuous power distribution represent sets of values corresponding to users that maximize the function. The equations are solved using waterfilling methods, wherein the continuous power distribution is determined for a previously determined bandwidth allocation, and/or the continuous bandwidth allocation is calculated for a previously determined power distribution.

27 Claims, 9 Drawing Sheets

PROPORTIONAL FAIR SCHEDULER FOR OFDMA WIRELESS SYSTEMS

CROSS-REFERENCE TO RELATED APPLICATION

This application claims the benefit of priority to U.S. Provisional Application No. 60/793,629 entitled "Proportional Fair Scheduler for OFDMA Wireless Systems", by Chenxi, Zhu et al. filed on Apr. 21, 2006 in the USPTO and incorporated by reference herein.

BACKGROUND OF THE INVENTION

1. Field of the Invention

The present invention relates to orthogonal frequency division multiple access (OFDMA) technology applied, for example, to wireless transmission systems. The present invention relates to scheduling the transmission power and/or the bandwidth to maximize the proportional fairness in a wireless transmission.

2. Description of the Related Art

Wireless transmission systems based on OFDMA, such as those defined by the IEEE 802.16 family of standards, are being developed for commercial applications. OFDMA schemes allow multiple users to concurrently transmit in the same time slot by sharing the bandwidth and transmission power. Various OFDMA channel allocation schemes have been proposed to exploit different channel properties such as frequency selective fading. For instance, Adaptive Modulation and Coding (AMC) schemes give each user a set of subchannels that are "close" and have similar characteristics to exploit diversity. Other "Distributed" schemes such as Partial Usage of SubChannels (PUSC) and Full Usage of SubChannels (FUSC) give users subchannels that are spread across the available band to average out the differences between different subchannels. The latter class of subchannelization schemes make the quality of different subchannels approximately the same and thus "flattens" the subchannels between the base station and a user.

In either case, it is necessary to choose an allocation of subchannels for users and to allocate transmission power levels to these users. For example, it may be desirable to balance individual quality of service (QoS) levels and "fairness" among the users, and to also maximize system capacity. Since two resources (bandwidth and power) might be optimized, a simple notion of fairness might not be useful, so the proportional fairness and capacity can be used. For example, the proportionally fair optimal point is chosen so that no user can increase their proportional rate (new rate/current rate) without hurting the other users.

A radio resource scheduler typically performs the allocation of subchannels and transmission power function for each time-slot, in real-time. In the OFDMA framework, typically the scheduler has to provide the bandwidth and transmission power allocation based on current channel conditions within strict time constraints.

SUMMARY OF THE INVENTION

According to the embodiments, a scheduler for distributed OFDMA channel allocation selects the subchannels and power levels for each user in a time slot while optimizing the system capacity under the proportional fairness criterion, in which equations obtained with Lagrangian multipliers that incorporate the system constraints, are solved by using water-filling methods. The proportional fairness capacity converges yielding an optimal allocation solution under assumptions of continuous bandwidth and power values. One of the continuous bandwidth allocation or the continuous power distribution or both is/are determined using the equations solved by using water-filling methods. The continuous power distribution is calculated for a previously determined bandwidth allocation, and the continuous bandwidth allocation is calculated for a previously determined continuous power distribution.

To increase computation efficiency by reducing the complexity and the computation time, a look-up table method may be used. The scheduler may determine the continuous bandwidth allocation and/or the continuous power distribution iteratively, until a difference between proportional fair capacities corresponding to sequential calculations becomes less than a predetermined number, and/or a predetermined maximal number of iterations are reached.

The scheduler may quantize the continuous bandwidth allocation and/or the continuous power distribution to allocate subchannels depending on (without limitation) subchannel width, number of available subchannels, may also quantize the continuous power distribution by using different modulation-coding schemes, or any combinations thereof. The scheduler may allocate the remaining sub-channels to the users by adding one channel to each user starting from the user with best channel quality in descending order. After converting the continuous bandwidth allocation and/or the continuous power distribution to a discrete bandwidth allocation and/or a discrete power allocation distribution, if more users than a predetermined number have a single channel, the scheduler may drop some users. The scheduler may quantize the continuous power distribution after the continuous bandwidth allocation is quantized. The scheduler may quantize the continuous power distribution before the continuous bandwidth allocation is quantized.

According to an aspect of an embodiment, a method of determining a discrete bandwidth allocation and/or a discrete power allocation distribution includes determining a continuous bandwidth allocation of a total bandwidth and a continuous power distribution of a total power among a plurality of users, by using the Lagrangian multipliers to set up a system of equations for one of the continuous bandwidth allocation, the continuous power distribution or both, and solving the system of equations using waterfilling methods, wherein a previously determined bandwidth allocation is used when solving the system of equations for the continuous power distribution, and/or a previously determined power allocation is used when solving the system of equations for the continuous power distribution.

These together with other aspects and advantages which will be subsequently apparent, reside in the details of construction and operation as more fully hereinafter described and claimed, reference being had to the accompanying drawings forming a part hereof, wherein like numerals refer to like parts throughout.

DETAILED DESCRIPTION OF THE PREFERRED EMBODIMENTS

Figure 1:
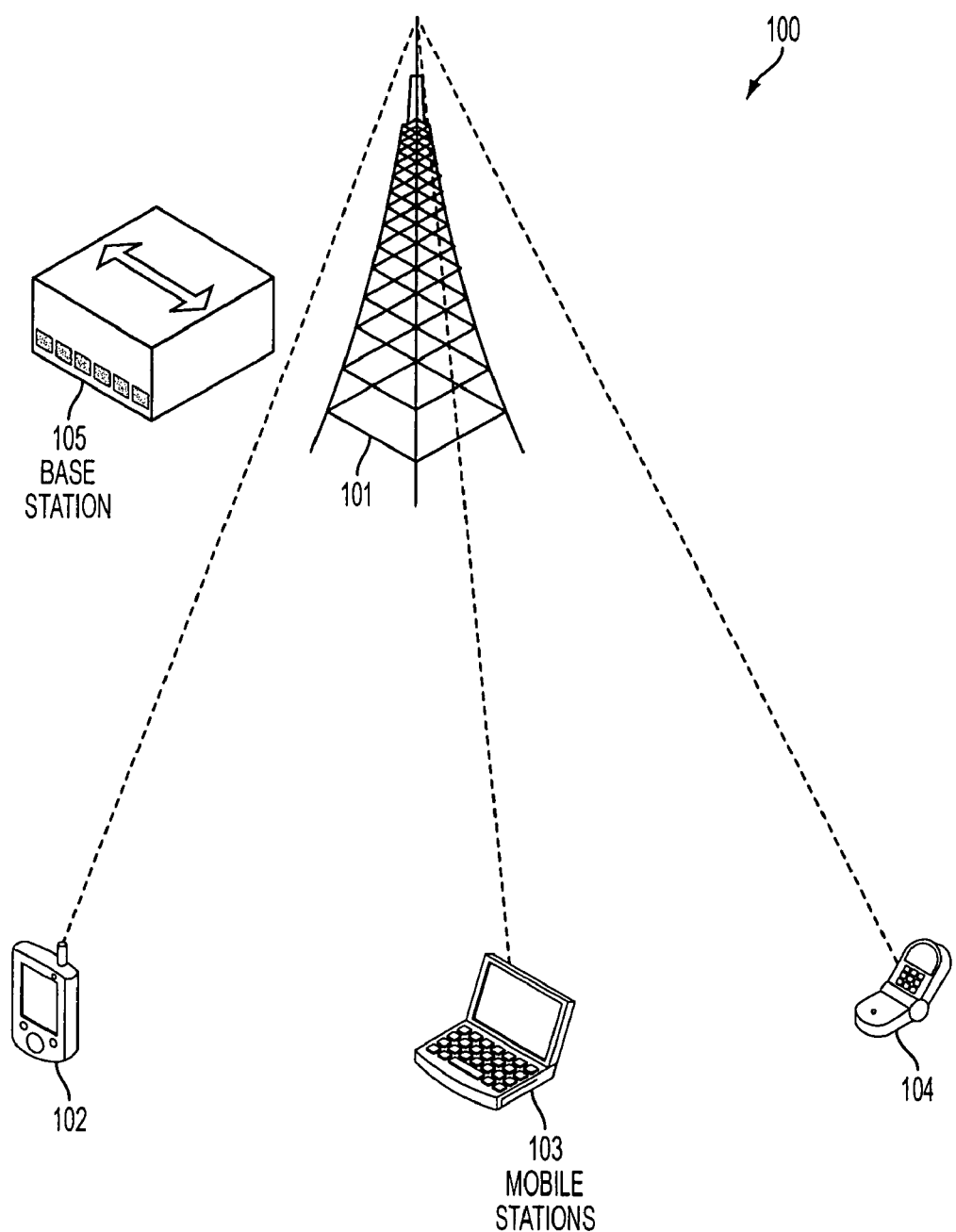
FIG. 1 illustrates a wireless communication system.

FIG. 1 illustrates a wireless communication system 100. An antenna, for example, outdoor antenna 101, can communicate simultaneously with a plurality of mobile stations such as a personal digital assistant (PDA) 102, a computer 103 and a cellular phone 104. A base station 105 allocates the frequency band and power for each signal exchanged between the mobile stations 102-104 and the outdoor antenna 101.

Figure 2:
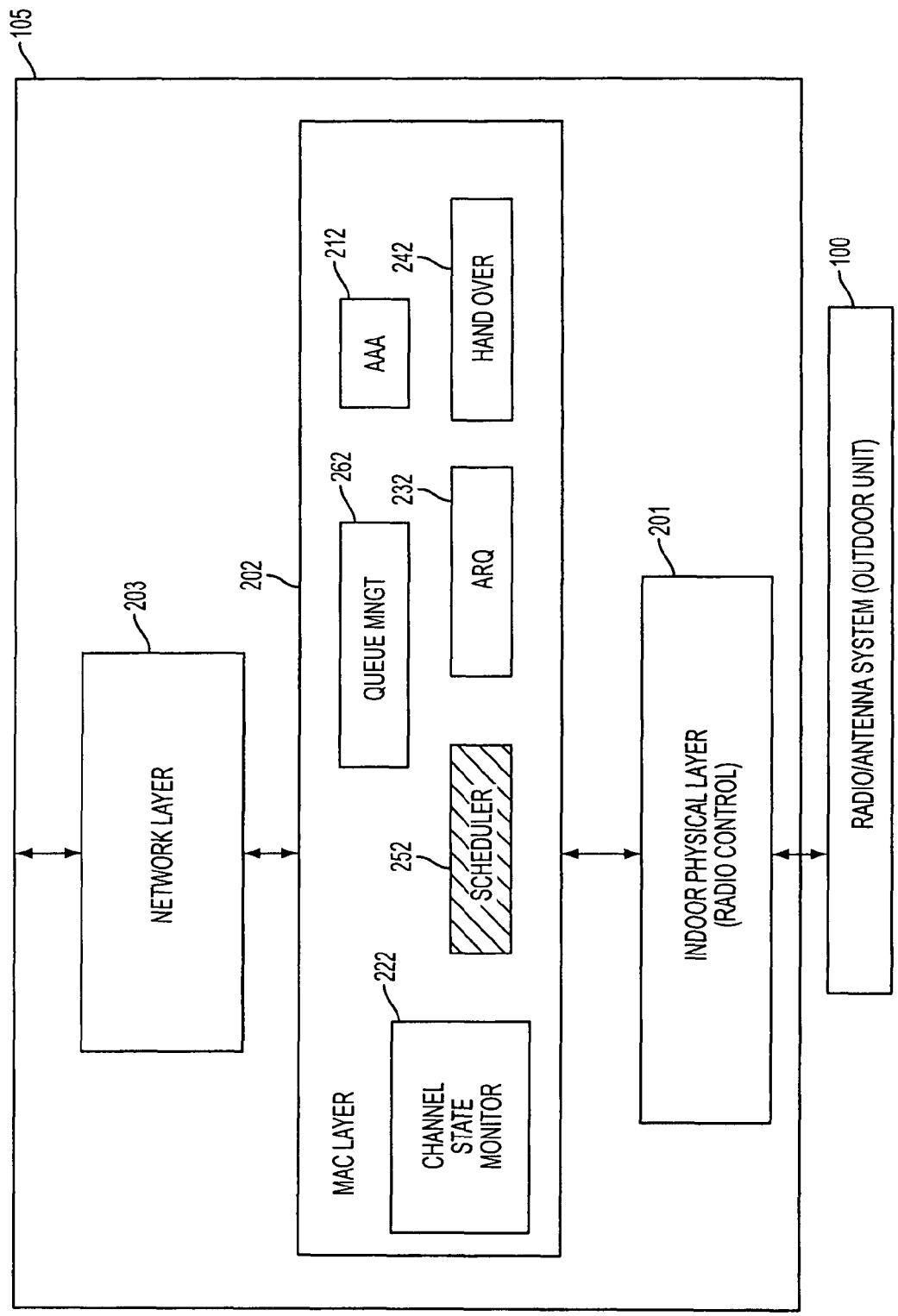
FIG. 2 is a functional block diagram of a base station unit in a wireless communication system, which in the MAC layer includes a scheduler according an embodiment of the present invention.

FIG. 2 is a functional block diagram of a base station unit 105 in a wireless communication system according to IEEE 802.16 family of standards, in which MAC layer 202 includes a scheduler 252 according to an embodiment of the present invention. Three main functional layers of the base station unit 105 can be the physical layer 201, which receives the radio signal from the outdoor antenna 100, the medium access control (MAC) 202 and the network layer 203 which are implemented in the base-station 105. As illustrated in FIG. 2, the MAC layer 202 includes modules performing functions such as queue management 262, authentication, authorization and accounting (AAA) 212, channel state monitoring 222, Automatic Repeat reQuest (ARQ) 232, and hand-over 242, according to IEEE 802.16. The MAC layer 202 also includes a scheduler 252 scheduling the subchannels (i.e. the bandwidth and/or the power allocation) according to embodiments of the present invention. According to an aspect of the embodiments, the scheduler 252 is implemented in a wireless communication system according to IEEE 802.16 standard family. However the claimed embodiments are not limited to IEEE. 802.16 systems and can be applied to any wireless communication system employing OFDMA.

Cellular-based wireless transmission technologies employing orthogonal frequency division multiple access (OFDMA), allow multiple users to transmit in the same time slot and dynamically share the bandwidth and transmission power among them. How to assign the bandwidth and transmission power is an important task of any scheduler in a system structured according to IEEE 802.16, and can affect the system performance significantly. Most scheduling schemes are designed for frequency-selective fading channels.

According to an aspect of the embodiments, a "user" refers to any device wirelessly communicating with a base station 105 using one or more allocated subchannels and a modulation coding scheme using a transmission protocol, for example, the protocols defined in IEEE 802.16 family of standards. According to one aspect of the present invention, the scheduler 252 solves the bandwidth and/or transmission power for a particular class of subchannelization schemes, in which the subchannels of a user all have the same qualities. This is true when the subcarriers of subchannels are distributed across the entire frequency band or hop randomly across the entire band. The PUSC and FUSC schemes of the IEEE 802.16 OFDMA PHY layer are such examples. With distributed subcarriers, a subchannel achieves the average channel quality of the entire band. The qualities of different subchannels of a user are all the same. Although each subchannel still comprises of frequency selective fading subcarriers, the channels appear flat from one subchannel to another. This allows to simplify the channel assignment problem significantly by considering only the amount of bandwidth $w_i$ assigned to user i. There is no need to consider the composite of the set of subchannels assigned to a user. The following scheduling methods are based on the "flatness" of these subchannels.

One characteristic of wireless networks is that different users usually have different requirements which makes it difficult to maintain the fairness among the users, i.e. not sacrificing the performance of some users because of others. The proportional fair optimal point can be defined as being the situation in which no user can increase its proportional rate (rate scaled by its current rate) without hurting the other users. The scheduler 252 of the present invention maximizes proportional fairness of the system by scheduling the transmission power and/or bandwidth in which equations are set using the Lagrangian multipliers to include the system constraints in a function that is maximum when the fair capacity is maximum, and the set equations are solved to derive the optimal bandwidth and/or power allocation. The first derivatives of the function with respect to all variables are made equal to zero to set up the equations. The methods below do not solve the optimal allocation of both power and bandwidth simultaneously, but they may first determine the optimal power allocation and then determine the optimal bandwidth allocation or vice versa. Alternatively, only one of the power distribution and the optimal bandwidth allocation to users may be obtained by solving the equations for maximizing proportional fairness of the system, the system constraints being included via the Lagrangian multipliers. The other one of the power distribution and the optimal bandwidth allocation to users may be obtained via any other known methods. According to one embodiment described below, the method is applied iteratively until the fair capacity converges. However, in alternative embodiments a single cycle of calculating the power distribution and/or the optimal bandwidth allocation may be performed.

The methods used by the scheduler 252 may determine the optimal power distribution and/or the optimal bandwidth allocation in an 1-dimensional space more efficiently, by using a table driven approach using a water-filling like method, with "water" pulled into the bandwidth and the power domain scaled by some specific functions. The optimal bandwidth and/or power allocation may be found by iteratively determining the optimal bandwidth and/or then determining the optimal power distribution or vice-versa.

The bandwidth and transmission power are both treated as continuous variables. For example, the transmission rate can follow the Gaussian channel capacity. To provide the physical layer with a usable solution, the bandwidth and transmission rates must be selected from a set of discrete values corresponding to the number of subchannels and finite modulation-and-coding schemes. Therefore, the scheduler 252 then quantizes the continuous bandwidth and power solution to practical values yielding a discrete bandwidth allocation and power distribution.

Figure 3:
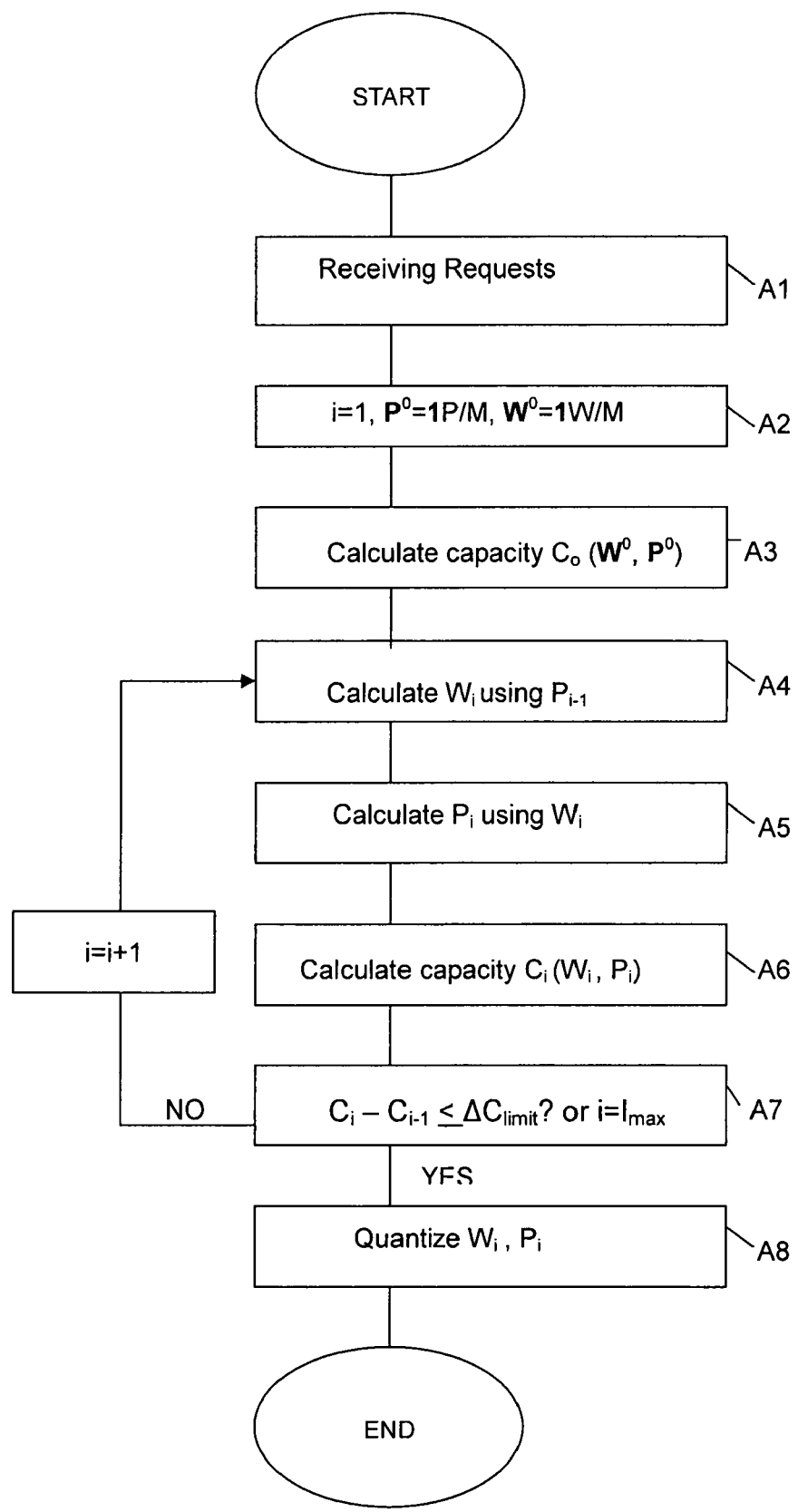
FIG. 3 is a flow chart of the operations performed by an OFDMA scheduler according to one embodiment of the present invention.

FIG. 3 illustrates a flow diagram of the operations performed in a scheduler 252 according to an embodiment of the present invention which yields the discrete bandwidth allocation and/or power distribution. FIG. 3 flow chart is an exemplary embodiment for determining both the optimized power distribution and the optimized bandwidth allocation using iterations. However it is understood that the embodiments are not limited to such a configuration and the embodiments can determine optimal power distribution, or optimal bandwidth allocation, or both, either iteratively or in one cycle, or any combinations thereof. At operation A1, the scheduler 252 receives requests from the users to be scheduled in a time slot, together with other user related parameters, such as noise power density and channel power gain.

In a single transmission time slot, the total transmission power of the base station is P and the total bandwidth is W. A given set of users to be scheduled $\mathcal{M}=\{1, 2, 3, \ldots, M\}$, has each a respective noise power density $n_i^o$ (including interference power) and the channel power gain from the base station to user i is $g_i$. The bandwidth and power assigned to user i is $(w_i, p_i)$, so that $$P \geq \sum_{i=1}^{M} p_i$$

$$W \geq \sum_{i=1}^{M} w_i$$

$$p_i \geq 0,$$

$$w_i \geq 0,$$

$$\forall i \in M.$$

The inequalities above can be used as equalities since typically the maximal capacity is achieved with all the bandwidth and all the power allocated to users. The resource assignment problem is formulated as an optimization problem, trying to maximize the proportional fair capacity of the system.

$$\text{(Fair Capacity Equation)} C(w, P) = \sum_{i=1}^{M} \log(r_i(w_i, p_i))$$

where the transmission rate for a channel i is $$r_i(w_i, p_i) = w_i \log\left(1 + \frac{p_i g_i}{n_i^0 w_i}\right) = w_i \log\left(1 + \frac{p_i}{n_i w_i}\right)$$

$$n_i = n_i^0 / g_i$$

where $n_i^o$ is the total noise and interference at receiver of user i, and $g_i$ is the channel gain from the base station to user i with a correction factor which reflects the gap between the ideal Shannon channel capacity for AWGN (average white Gaussian noise) channel and the capacity of the adopted modulation and coding scheme.

In the systems following the standard IEEE 802.16, each user can provide the channel gain and noise information to the base station. Consider $w=(w_1, w_2, \ldots, w_M)$ and $p=(p_1, p_2, \ldots p_M)$ and designate the optimal bandwidth-power as $(w^*,p^*)$. Then $$(w^*, p^*) = \text{argmax}_{(w,p)} \sum_{i=1}^{M} \log(r_i(w_i, p_i))$$

$$= \text{argmax}_{(w,p)} \log\left(\prod_{i=1}^{M} r_i(w_i, p_i)\right)$$

$$= \text{argmax}_{(w,p)} \prod_{i=1}^{M} w_i \log\left(1 + \frac{p_i}{n_i w_i}\right)$$

$$= \text{argmax}_{(w,p)} F(w, p)$$

Using Lagrangian multipliers method, the following Lagrangian combines the constraints and the function F(w,p) that is maximized when the fair capacity is maximized as shown above.

$$\text{(Lagrangian function)} L(w, p, \lambda_1, \lambda_2) =$$
$$F(w, p) + \lambda_1\left(P - \sum_{i=1}^{M} p_i\right) + \lambda_2\left(W - \sum_{i=1}^{M} w_i\right).$$

The derivatives of the Lagrangian with respect to $p_i$ and $w_i$ are zero for the optimal bandwidth and power allocation $(w^*, p^*)$
(First Derivatives to User Power=0)

$$\frac{\partial L(w, p, \lambda_1, \lambda_2)}{\partial p_i}\bigg|_{(w^*,p^*)} = \frac{F(w^*, p^*)}{\log\left(1 + \frac{p_i^*}{n_i w_i^*}\right)} \frac{1}{p_i^* + n_i w_i^*} - \lambda_1 = 0$$

$$\Rightarrow (p_i^* + n_i w_i^*) \log\left(1 + \frac{p_i^*}{n_i w_i^*}\right) = \frac{F(w^*, p^*)}{\lambda_1} = \lambda_{11}, \forall i \in M.$$

(First Derivatives to User Bandwidth=0)

$$\frac{\partial L(w, p, \lambda_1, \lambda_2)}{\partial w_i}\bigg|_{(w^*,p^*)} =$$

$$\frac{F(w^*, p^*)}{w_i \log\left(1 + \frac{p_i^*}{n_i w_i^*}\right)} \left(\log\left(1 + \frac{p_i^*}{n_i w_i^*}\right) - \frac{p_i^*}{p_i^* + n_i w_i^*}\right) - \lambda_2 = 0$$

$$\frac{1}{w_i^*}\left(1 - \frac{p_i^*}{(p_i^* + n_i w_i^*)\log\left(1 + \frac{p_i^*}{n_i p_i^*}\right)}\right) = \frac{\lambda_2}{F(w^*, p^*)} = \lambda_{22}, \forall i \in M$$

The above equations together with the power constraint and the bandwidth constraints form a set of nonlinear equations for the optimal bandwidth and power allocation (w*, p*). The optimal bandwidth and power allocation is achieved within the boundary of the feasible region, because if any $w_i=0$ or any $p_i=0$, the rate of user i is 0 and the fair capacity which is the objective function is $-\infty$. The four equations then must be solved. Two sub-problems, one on finding the optimal power allocation p*(w) with given bandwidth allocation w, and one on finding the optimal bandwidth allocation w*(p) with given power allocation p can be solved. The scheduler 252 determines the optimal allocation (w*, p*) by iteratively searching for the optimal bandwidth allocation and the optimal power distribution.

At operation A2, the scheduler 252 initiates the iterative process of determining an optimized bandwidth and power distribution. The starting point can be arbitrary or predetermined, according to, for example, $(w^o, p^o)=(1W/M, 1P/M)$ where 1 is the all 1 vector of length M. At operation A3, the scheduler 252 performs an initial calculation of the Fair Capacity $C_o (w^o, p^o)$ using an initial power and channel distribution, for example, equal allocation of power and bandwidth for each user. In each iteration cycle (operations A4-A7), in operation A4, the scheduler 252 determines a bandwidth distribution $w_i$ using the existing power distribution $p_{i-1}$. In operation A5, the scheduler then determines a power distribution using the previously calculated bandwidth distribution. (In an alternative embodiment, the power distribution using the existing bandwidth allocation may be calculated first A5, and then a new bandwidth allocation is determined using the calculated power distribution A4.)

The bandwidth and power vector pair $(w^k, p^k)$ corresponding to the $k^{th}$ round of calculation is updated iteratively and used to calculate the fair capacity in operation A6:

$$w^k = w^*(p^{k-1}) \Rightarrow C_w^k = C(w^k, p^{k-1})$$

$$p^k = p^*(w^k) \Rightarrow C_p^k = C(w^k, p^k), k=1, 2, 3, \ldots$$

until the convergence criterion $$C_p^k - C_p^{k-1} \leq \epsilon$$

is met, where $\epsilon>0$ is a small positive number. The fair capacity corresponding to the bandwidth distribution and the power distribution is calculated (A6) and compared with the previous cycle fair capacity (A7). The computation can also be stopped after reaching a predetermined maximal number of iterations $I_{max}$. If the difference between the fair capacities of subsequent cycles is bigger than a predetermined number, a new cycle is performed (A4-A7). Since each time either the bandwidth or the transmission power is optimized, the fair capacity increases:

$$C_w^{k-1} \leq C_p^{k-1} < C_w^k \leq C_p^k.$$

After determining of the optimal bandwidth and power, the continuous solution is quantized (A8). In another embodiment, the power distribution may be calculated first and the bandwidth may be calculated afterwards with an alternative method (described later) using the calculated power distribution.

To find the optimal power allocation $p^*$ for a given bandwidth allocation w which maximizes the fair capacity C and is subject to the total power constraint such as in operation A5 in FIG. 3, the Lagrangian degenerates into $$\lambda_3 = (p_i^*(w) + n_i w_i) \log\left(1 + \frac{p_i^*(w)}{n_i w_i}\right)$$

$$P = \sum_{i=1}^{M} p_i$$

The scheduler 252 solves this equation by using a waterfilling approach in the functional domain defined by $$f_{\tilde{n}}^P(p) = (p + \tilde{n}) \log\left(1 + \frac{p}{\tilde{n}}\right).$$

Note that the function $f_{\tilde{n}}^P(p)$ is parameterized by $\tilde{n}=nw$ which is the total noise power encountered by a user in its assigned bandwidth. $f_{\tilde{n}}^P(p)$ is a strictly convex and monotonic increasing function of p for all $\tilde{n}$, and its inverse $f_{\tilde{n}}^{P-1}(\lambda)$ is a strictly concave and monotonic increasing function. The linear combination $$\sum_{i=1}^{M} f_{\tilde{n}}^{p-1}(\lambda_3)$$

is also strictly concave and monotonic increasing, which makes it easy to perform 1-dimensional search in the direction of $\lambda_3$ using the inverse function $p=f_{\tilde{n}}^{p-1}(\lambda_3)$. The problem becomes finding $\lambda_3^*$ such that $$\sum_{i=1}^{M} f_{\tilde{n}_i}^{p-1}(\lambda_3^*) - P = 0$$

$$p_i(w) = f_{\tilde{n}_i}^{p-1}(\lambda_3^*).$$

The scheduler 252 finds the optimal $\lambda_3^*$ using a binary search or Newton's method. The monotonicity of $f_{\tilde{n}}^{p-1}(\lambda)$, thus $$\sum_{i=1}^{M} f_{\tilde{n}}^{p-1}(\lambda),$$

guarantees the existence and uniqueness of $\lambda_3^*$ and, consequently, the uniqueness of the solution $p^*(w)$. Instead of computing $f_{\tilde{n}}^{p-1}(\lambda)$ for different $\tilde{n}_i$, one embodiment of the scheduler may use the function $$g(x) = (1 + x)\log(1 + x)$$

so that $$\lambda_3^* = \tilde{n}_i \left(1 + \frac{p_i^*(w)}{\tilde{n}_i}\right) \log\left(1 + \frac{p_i^*(w)}{\tilde{n}_i}\right) = \tilde{n}_i g\left(\frac{p_i^*(w)}{\tilde{n}_i}\right)$$

$$p_i^*(w) = \tilde{n}_i g^{-1}\left(\frac{\lambda_3^*}{\tilde{n}_i}\right) = n_i w_i g^{-1}\left(\frac{\lambda_3^*}{n_i w_i}\right)$$

and then $$\sum_{i=1}^{M} n_i w_i g_i^{-1}\left(\frac{\lambda_3^*}{n_i w_i}\right) - P = 0.$$

In order to shorten the time of solving the above equation, values of the inverse function $g^{-1}$ may be pre-computed and stored in a table for on-line use. The search of $\lambda_3^*$ in the scheduler 252, may become a series of look-up operations performed in real-time. The functions $f_{\tilde{n}}^P(p)$, $g(x)$ and $g^{-1}$ are smooth so by using interpolation between the values stored in the look-up table (i.e., scaling), the memory requirement is reduced without significant loss of accuracy.

The scheduler finds the optimal band width allocation $w^*$ for a given power p assignment subject to the total power constraint, such as in operation A4 in FIG. 3, using the Lagrangian which degenerates into $$\lambda_4 = \frac{1}{w_i^*(p)}\left(1 - \frac{p_i}{(p_i + n_i w_i^*(p))\log\left(1 + \frac{p_i}{n_i w_i^*(p)}\right)}\right), \forall i \in M$$

$$W \geq \sum_{i=1}^{M} w_i(p)$$

The scheduler can solve this equation also by a water-filling approach in the functional domain (wherein $\tilde{p}=p/n$) by using the function $$f_{\tilde{p}}^w(w) = \frac{1}{w}\left(1 - \frac{1}{\left(1+\frac{w}{\tilde{p}}\right)\log\left(1+\frac{\tilde{p}}{w}\right)}\right).$$

Note that $f_{\tilde{p}}^w(w)$ is a strictly convex and monotonic decreasing function of w, and its inverse $f_{\tilde{p}}^{w-1}(\lambda)$ is a convex and monotonic decreasing function. The linear combination $$\sum_{i=1}^{M} f_{\tilde{n}}^{p-1}(\lambda_3)$$

is also convex and monotonic decreasing function of $\lambda$, which accelerates the 1-dimensional search for $\lambda_4^*$ such that $$\sum_{i=1}^{M} f_{\tilde{p}_i}^{w-1}(\lambda_4^*) - W = 0$$

$$w_i(p) = f_{\tilde{p}_i}^{w-1}(\lambda_4^*).$$

The scheduler can also find the optimal $\lambda_4^*$ using binary search or Newton's method. The monotonicity of $f_{\tilde{p}}^{w-1}(\lambda)$ thus $$\sum_{i=1}^{M} f_{\tilde{p}_i}^{w-1}(\lambda),$$

guarantees the existence and uniqueness of $\lambda_4^*$ and, consequently, the uniqueness of the solution w*(p). Further using the function $$h(x) = \frac{1}{x}\left(1 - \frac{1}{(1+x)\log(1+1/x)}\right)$$

one can rewrite $$\lambda_4^* = \frac{1}{\tilde{p}_i} h\left(\frac{w_i^*(p)}{\tilde{p}_i^*}\right), \forall i \in M$$

$$w_i^*(p) = \tilde{p}_i h^{-1}(\lambda_4 \tilde{p}_i) = \frac{p_i}{n_i} h^{-1}\left(\lambda_4 \frac{p_i}{n_i}\right)$$

and then $$\sum_{i=1}^{M} \frac{p_i}{n_i} h^{-1}\left(\lambda_4^* \frac{p_i}{n_i}\right) - W = 0.$$

Same as for $g^{-1}$, in order to shorten the time of solving the above equation, values of the inverse function $h^{-1}$ may be pre-computed and stored in a table for on-line use. The search of $\lambda_4^*$ in the scheduler 252, may become a series of look-up operations performed in real-time.

In another embodiment, the scheduler 252 further reduces the complexity of determining the continuous bandwidth allocation and power distribution by using only the function $g^{-1}$. By substitution in the equations obtained from Lagrangian derivatives, one can obtain the equation $$\frac{1}{w_i^*}\left(1 - \frac{p_i^*}{\lambda_{11}}\right) = \lambda_{22}$$

which suggests $$w_i^* \propto \left(1 - \frac{p_i^*}{\lambda_{11}}\right).$$

In this embodiment, starting again from $(w^o, p^o)=(1W/M, 1P/M)$, the bandwidth and power vector $(w^k, p^k)$ is updated iteratively:

$$t_i^k = \left(1 - \frac{p_i^{k-1}}{\lambda_3^{k-1*}}\right),$$

$$w_i^k = W \frac{t_i^k}{\sum_{i=1}^{M} t_i^k}, i \in M$$

$$p^K = p^*(w^K),$$

$$C_p^k = C(w^k, p^k),$$

$$k = 1, 2, 3, \ldots,$$

until $C_p^k$ converges. The calculation using $h^{-1}$ may be replaced by scaling.

Above are described methods used in different embodiments that search for an optimal $(w^*, p^*)$ in the continuous domain. Practically in any OFDMA technology, the bandwidth assigned to a user takes integer values (number of subchannels), and the transmission rate must assume discrete value from a pre-defined set of modulation and coding schemes. The latter usually has a trend following the Gaussian channel capacity with some offset. As an example, the modulation-coding schemes defined in 802.16 OFDMA are given as follows.

| Modulation/Codi | Tx rate | SINR(dB) |
|---|---|---|
| QPSK, ½ | 1 | 9.4 |
| QPSK, ¾ | 1.5 | 11.2 |
| 16QAM, ½ | 2 | 16.4 |
| 16QAM, ¾ | 3 | 18.2 |
| 64QAM, ⅔ | 4 | 22.7 |
| 64QAM, ¾ | 4.5 | 24.4 |

To translate the continuous $(w^*, p^*)$ into a discrete bandwidth-transmission rate vector at operation A8, the scheduler may apply one of the following quantization methods. Suppose the bandwidth of each subchannel is Bs Hz, and there are total $N_s$ subchannels, $B_s N_s = W$. Let the discrete bandwidth assigned to user i be $W_i^d$ subchannels. To quantize the bandwidth into subchannels, the scheduler first computes $$w_i^d = \max\left(1, \left\lfloor \frac{w_i^*}{B_s} \right\rfloor\right), i \in M.$$

If $$\sum_{i=1}^{M} w_i^d < N_s,$$

then the scheduler assigns the remaining unused subchannels $$N_s - \sum_{i=1}^{M} w_i^d$$

1 each to the users, for example, starting from the user with best channel quality in descending order. The rationale for starting with the best user is that these users are more limited by degree of freedom (bandwidth) than power. If $$\sum_{i=1}^{M} w_i^d > N_s,$$

then the schedulers deallocates as subchannel from each user starting from the user with worst channel quality if $w_i^s > 1$, until $$\sum_{i=1}^{M} w_i^d = N_s.$$

If too many users only have a single channel, the scheduler cannot schedule all M users in the same slot and some users are dropped.

After bandwidth quantization in operation A8 (and possible reshuffling of subchannels), the scheduler may reshuffle the power assigned to the users as well. Suppose there are total S coding and modulation schemes, and the set $\Gamma = \{\gamma^1, \gamma^2, \ldots, \gamma_S\}$ is their required SINRs assorted in ascending order (this may include any extra SINR margin added by link adaptation for robustness). Define the floor operator $$\Gamma\lfloor\gamma\rfloor = \begin{cases} \gamma^s & \gamma \geq \gamma^s \\ \gamma^j & \gamma^j \leq \gamma < \gamma^{j+1} \\ \gamma^1 & \gamma < \gamma^1 \end{cases}$$

and the ceiling operation $$\Gamma\lceil\gamma\rceil = \begin{cases} \gamma^s & \gamma \geq \gamma^s \\ \gamma^{j+1} & \gamma^j < \gamma \leq \gamma^{j+1} \\ \gamma^1 & \gamma < \gamma^1 \end{cases}$$

Note that $\Gamma\lfloor\gamma\rfloor$ and $\Gamma\lceil\gamma\rceil$ are always in the set $\Gamma$ and correspond to a certain coding and modulation scheme.

The schedulers computes the SINR of the users as $$\gamma_i = \frac{p_i^*}{n_i w_i^d B_s}$$

$$p_i^l = \Gamma\lfloor\hat{\gamma}_i\rfloor n_i w_i^d B_s,$$

$$\forall i \in M,$$

where $p_i^l$ is the lowest power required to support the highest coding/modulation rate for user i given its bandwidth and power assignment. At the next step, the left over transmission power $$P^e = P - \sum_{i=1}^{M} p_i^l \geq 0$$

is assigned to the users starting from the lowest channel quality. If $$P^e \geq (\gamma\lceil\gamma_i\rceil - \gamma_i) n_i w_i^d B_s,$$

then $$p_i^d = \Gamma\lceil\gamma_i\rceil n_i w_i^d B_s,$$

$$P^{e'} = P^e - (\Gamma\lceil\gamma_i\rceil - \gamma_i) n_i w_i^d B_s.$$

The scheduler may use the extra power $P^{e'}$ to boost the modulation and coding rates of the users to the next level. Otherwise $$p_i^d = \Gamma\lfloor\gamma_i\rfloor n_i w_i^d B_s,$$

$$P^{e''} = P^e + (\gamma_i - \Gamma\lfloor\gamma_i\rfloor) n_i w_i^d B_s.$$

If there is no enough power to boost the coding and modulation level 1 step high, the scheduler uses the current coding and modulation scheme. The scheduler assigns the residual power to other users. If $$P^e = P - \sum_{i=1}^{M} p_i^l < 0,$$

probably the scheduler attempts to schedule transmission to too many users. Then the scheduler decreases the number of subchannels assigned to the users by taking 1 subchannel away starting from the user with the largest number of subchannels assigned until $$P^e = P - \sum_{i=1}^{M} p_i^l \geq 0.$$

Given $(w_i^d, p_i^d)$, user i may also decide to use its power $p_i^d$ only in $w_i^{d'} < w_i^d$ subchannels if it can achieve a higher total throughput.

The scheduler 252 quantizes and reshuffles the bandwidth and power based on the optimal (w*, p*) calculated in the continuous domain and heuristics, so clearly the discrete allocation is suboptimal. The advantage of the proposed scheme is its low complexity since it avoids exhaustive search in the discrete domain.

Figure 4:
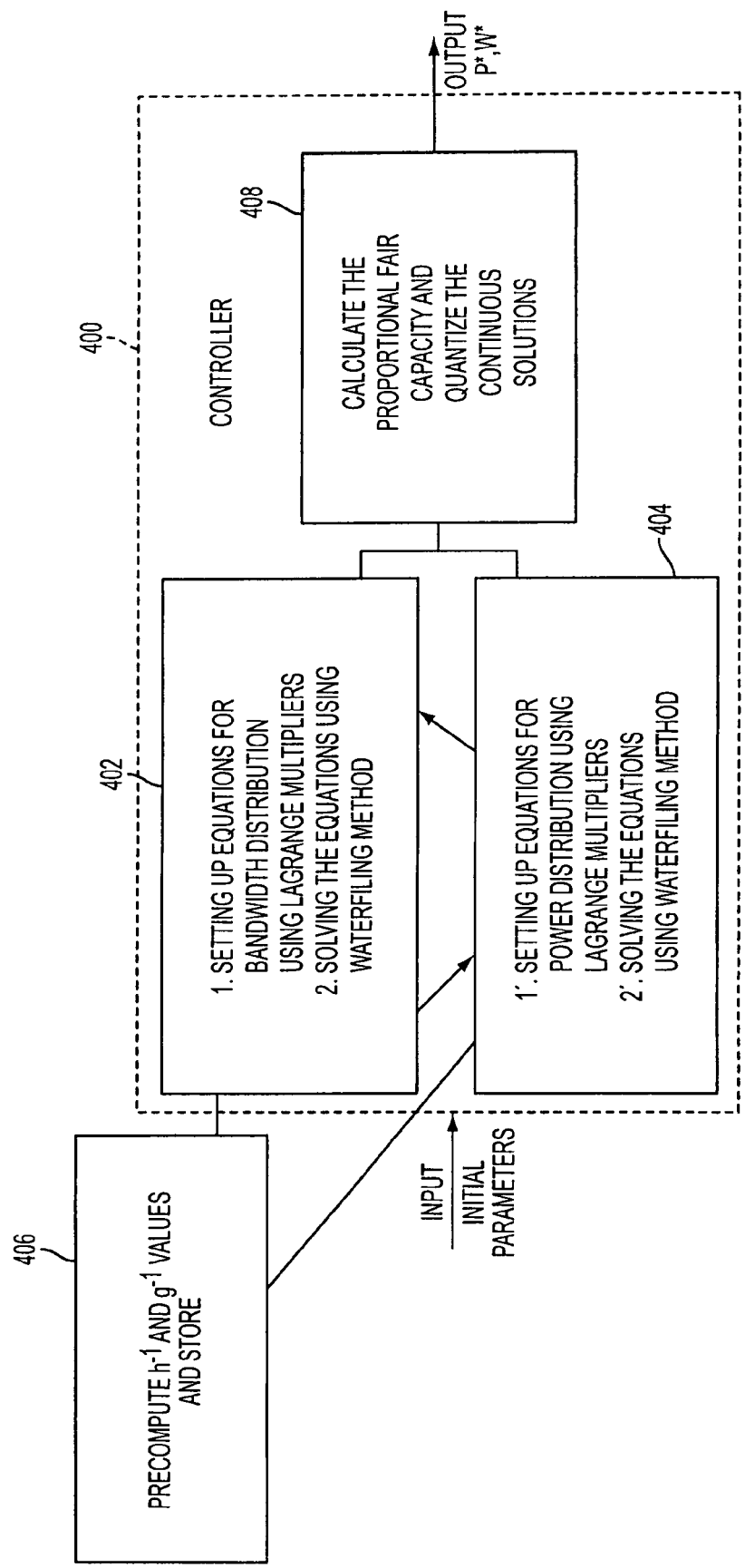
FIG. 4 is a data flow chart for calculating the continuous bandwidth and power distribution according to an embodiment of the present invention.

FIG. 4 is a data flow chart for calculating the continuous bandwidth allocation and power distribution according to an embodiment of the present invention. FIG. 4 is a data flow chart corresponding to the operations in FIG. 3.

In FIG. 4, a programmed controller 400 executes embodiment operations corresponding to setting up equations for a continuous bandwidth allocation of a total bandwidth and a continuous power distribution of a total power, wherein the equations are set up using the Lagrangian multipliers for the continuous bandwidth allocation and for the continuous power distribution, respectively, solving the equations using waterfilling methods, wherein the continuous power distribution is determined for a previously determined bandwidth allocation, at 402 and the continuous bandwidth allocation is calculated for a previously determined power distribution, at 404. The input initial parameters are the available power and bandwidth to be distributed to users by the base station 105, as well as the requirements and characteristics, such as noise of each user to be scheduled. Solving the equations is performed efficiently by using pre-computed values of $h^{-1}$ and $g^{-1}$ as illustrated in 406. At 408, the proportional fair capacity is calculated, and the continuous power distribution and continuous bandwidth allocation are quantized, that is, converted in a discrete bandwidth allocation and a discrete power distribution. The discrete bandwidth allocation and the discrete power distribution, and the modulation and coding scheme determined thereof, are communicated to the users for a communication between the base station and the users in the downlink direction during a time interval.

Figure 5:
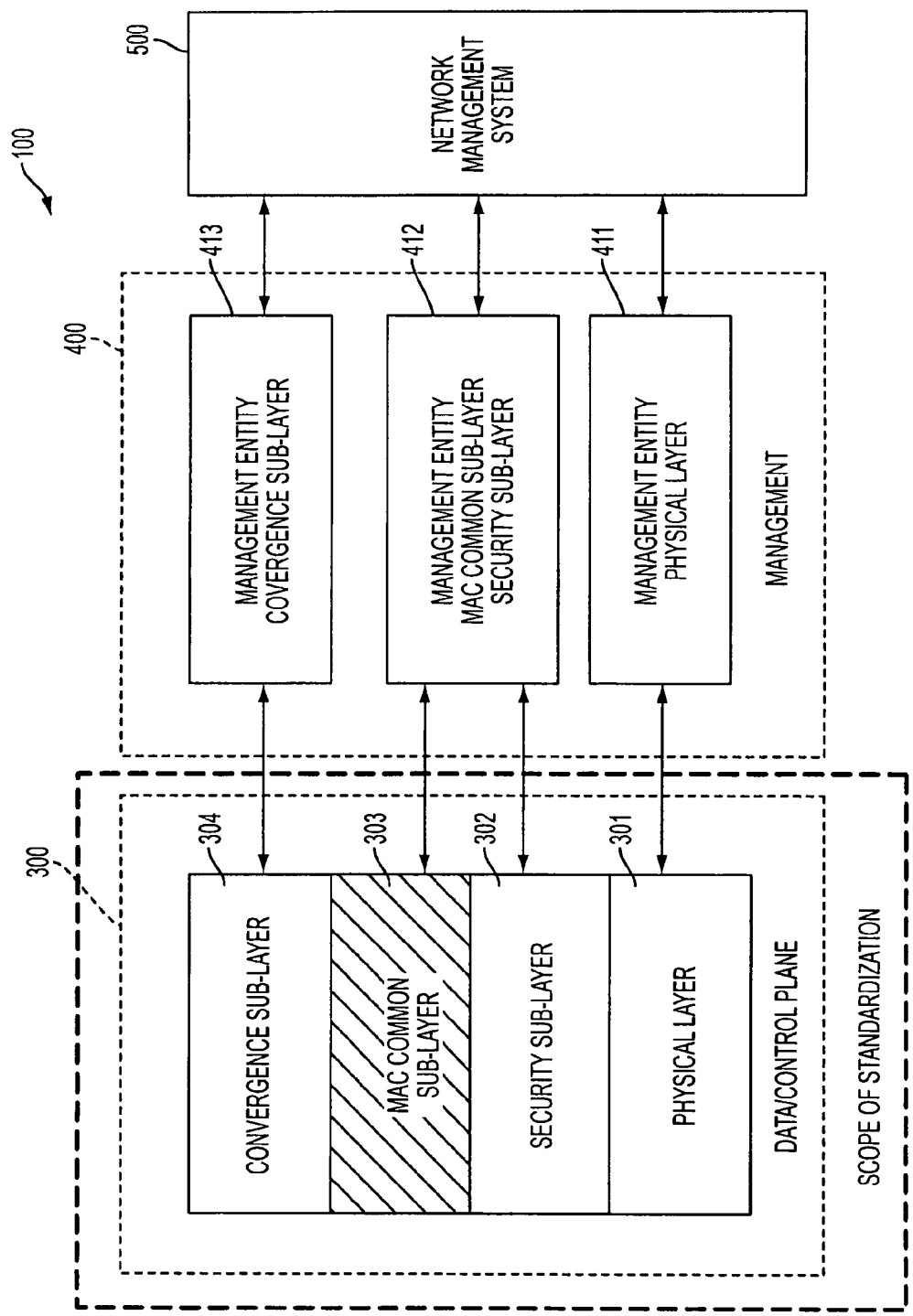
FIG. 5 is a functional block diagram of a wireless communication system having a base station unit according to an embodiment of the present invention.

FIG. 5 illustrates a wireless communication system 100, in which the base station unit 105 includes an embodiment of the present invention in the MAC Common Sub-Layer 303. The standard IEEE 802.16 defines operation within the data control plane 300 including the physical layer 301, the security sub-layer 302, the MAC common sub-layer 303, and the convergence sub-layer 304. This layer organization is defined within the standard IEEE 802.16, and only the specific implementation of function within the sub-layers is different. An embodiment of the present general inventive concept is a scheduler 252 functioning within the MAC common sub-layer 303. The corresponding management entities in the management plane (411, 412, 413) conduct the functions of configuration, monitoring and accounting of their corresponding entities in the control/data plane 300.

Figure 6:
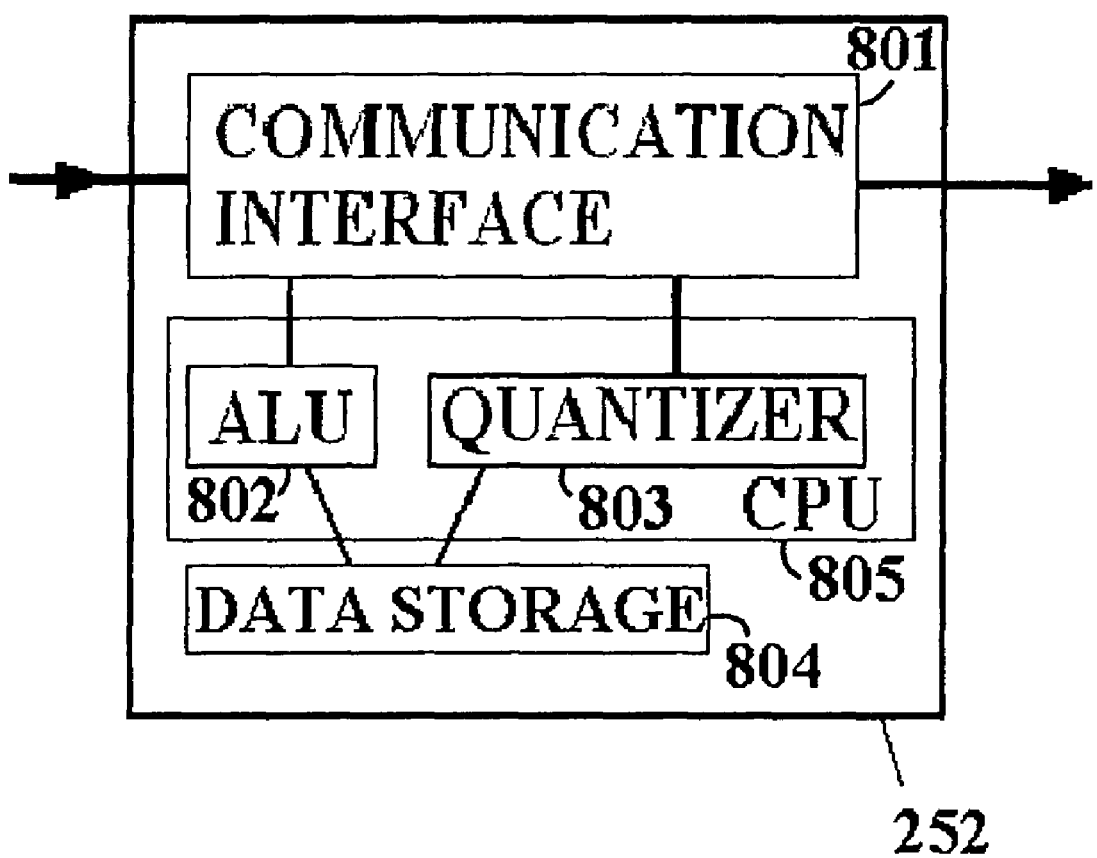
FIG. 6 is a functional block diagram of a scheduler according to an embodiment of the present general inventive concept.

FIG. 6 is a functional block diagram illustrating a scheduler 252 according to another embodiment of the present invention. The scheduler 252 includes a continuous solution calculator (Arithmetic and Logic Unit ALU) 802, a data storage 804 to store the look-up tables, a quantization unit (quantizer) 803, and a communication interface 801. The continuous solution calculator 802 determines a continuous bandwidth and/or a power allocation distribution of a total power and a total bandwidth among a plurality of users, according to, for example, the operations A1-A8 using look-up tables. The continuous bandwidth and power allocation distribution is calculated using the Lagrangian multipliers and waterfilling methods with the look-up tables stored in the data storage 804. The continuous bandwidth and power allocation distribution is determined iteratively until a difference between fair capacities corresponding to sequential cycles of bandwidth and power distribution optimizations becomes less than a predetermined number. The continuous solution calculating unit 802 may determine the continuous bandwidth and power allocation distribution using a method according to one of the scheduling methods described above. The quantizing unit 803 converts the continuous bandwidth and power allocation distribution into a discrete bandwidth and power allocation distribution, according to a subchannel width, number of available subchannels, and modulation and coding schemes. The quantizing unit 803 and the continuous solution calculator 802 are implemented as software and/or computing hardware, for example, a central processing unit (CPU) 805. The quantizing unit 803 performs the conversion according to the any of the quantization methods described above. The communication interface 801 receives information about the users and outputs the discrete bandwidth and power allocation distribution towards the physical layer.

Figure 7:
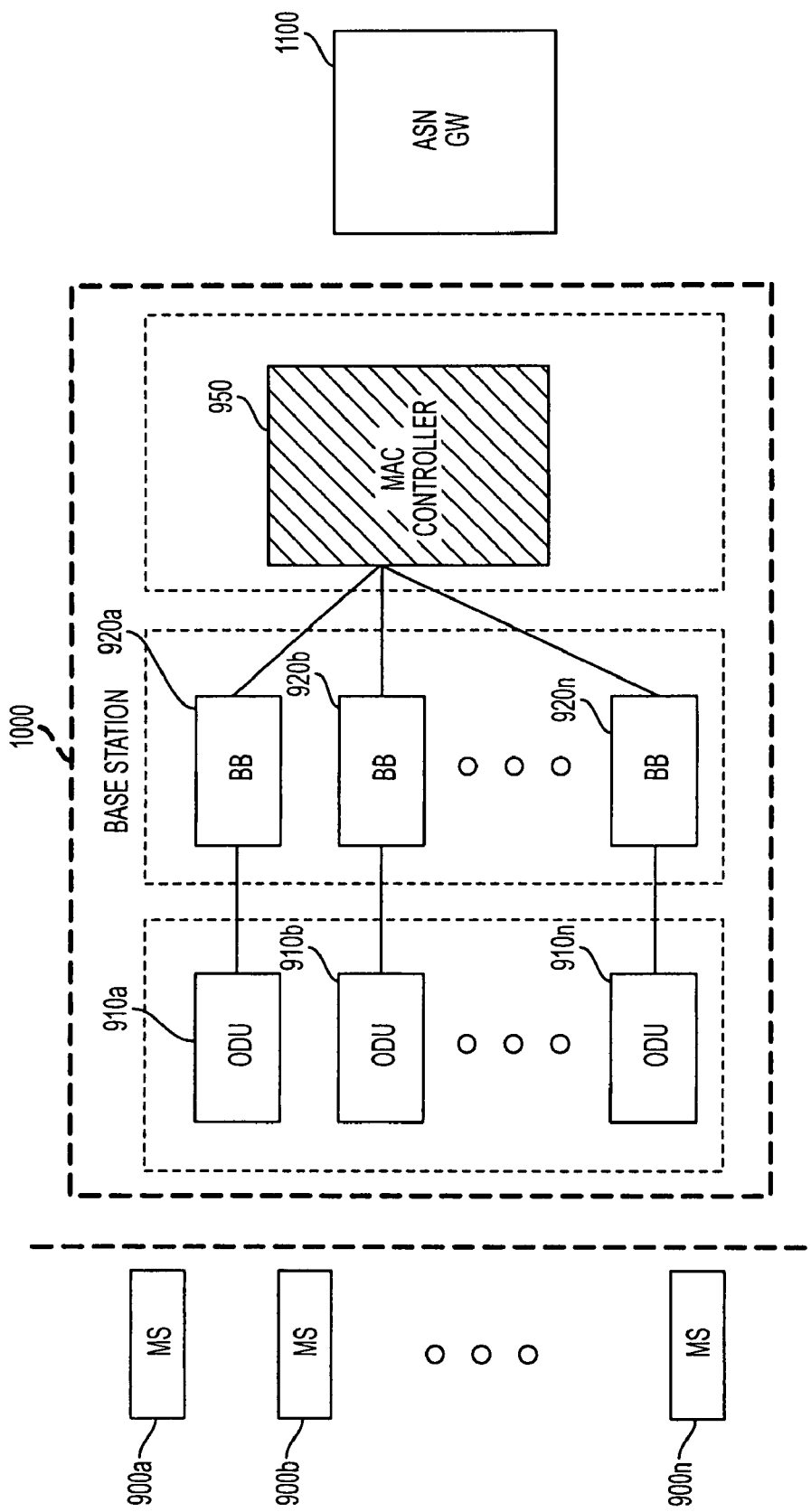
FIG. 7 is a functional block diagram illustrating a base station configuration according to another embodiment of the present general inventive concept.

FIG. 7 is a functional block diagram illustrating a base station 1000 configuration according to another embodiment of the present invention. The MAC controller 950 illustrated in FIG. 5 performs the bandwidth and power allocation as described, for example, in FIGS. 3 and 4, or any other embodiments described above, for each of a plurality of outdoor units (ODU) 910a, 910b, ..., 910n in communication with mobile stations (MS) 900a, 900b, ..., 900n, each outdoor unit being managed via a baseband (BB) processing module 920a, 920b, ..., 920n. The base station 1000 communicates with the access service network gateway (ASN GW).

Figure 8:
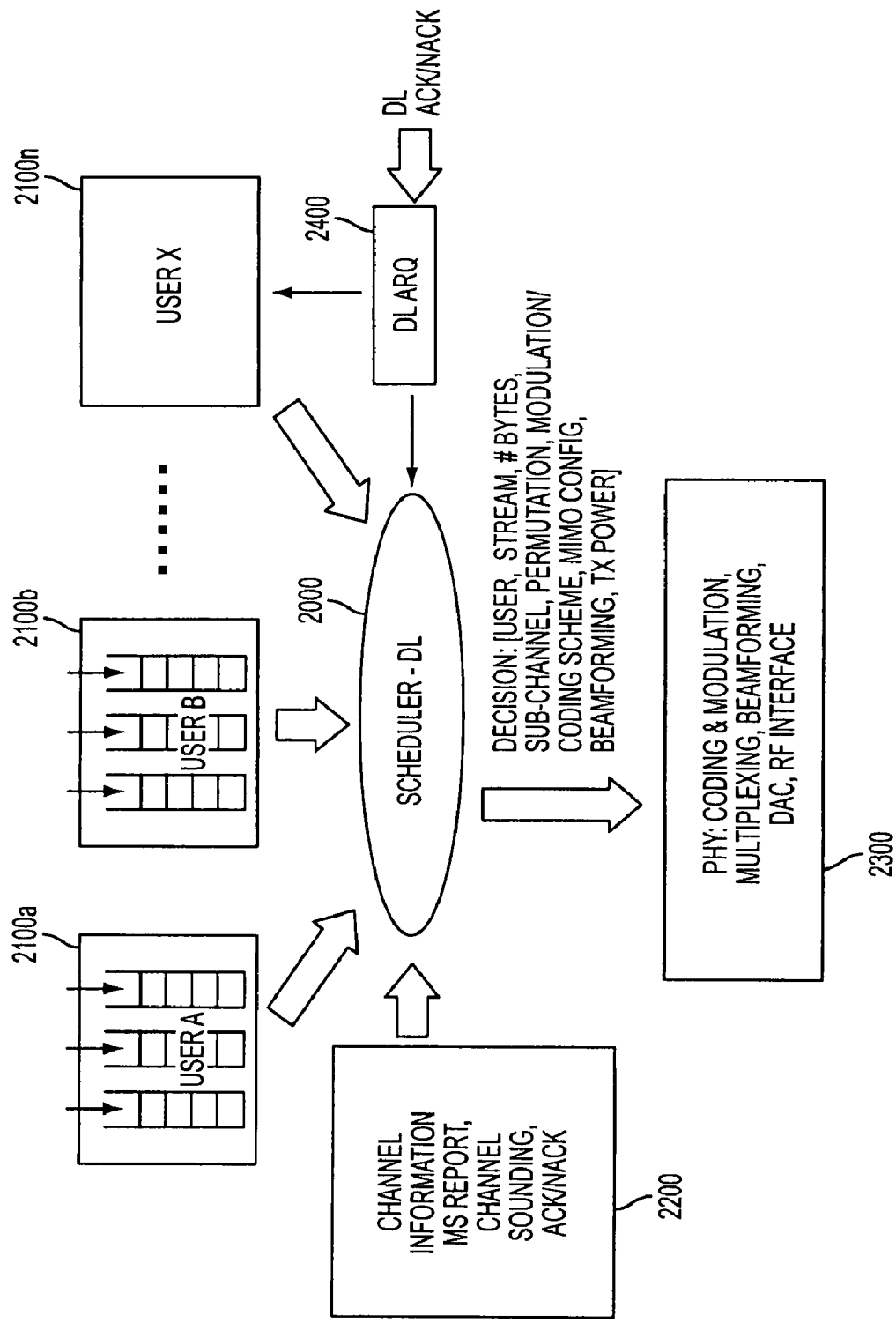
FIG. 8 is a functional block diagram illustrating the functioning of a scheduler during a downlink operation according to an embodiment of the present general inventive concept.

FIG. 8 is a functional block diagram illustrating the role of a downlink scheduler 2000. The scheduler 2000 receives input regarding users 2100a, 2100b, ..., 2100n and additional channel information 2200. The scheduler 2000 performs the bandwidth and power distribution to users as described, for example, in FIGS. 3 and 4, or any other embodiments described above. The scheduler 2000 communicates the decision regarding the stream, number of bytes, sub-channel, permutation, modulation/coding scheme, MIMO configuration, beam-forming and power for each user to the physical layer 2300. A downlink automatic repeat request (DLARQ) 2400 is connected to both the scheduler 2000 and each of the users 2100a, 2100b, ..., 2100n.

Figure 9:
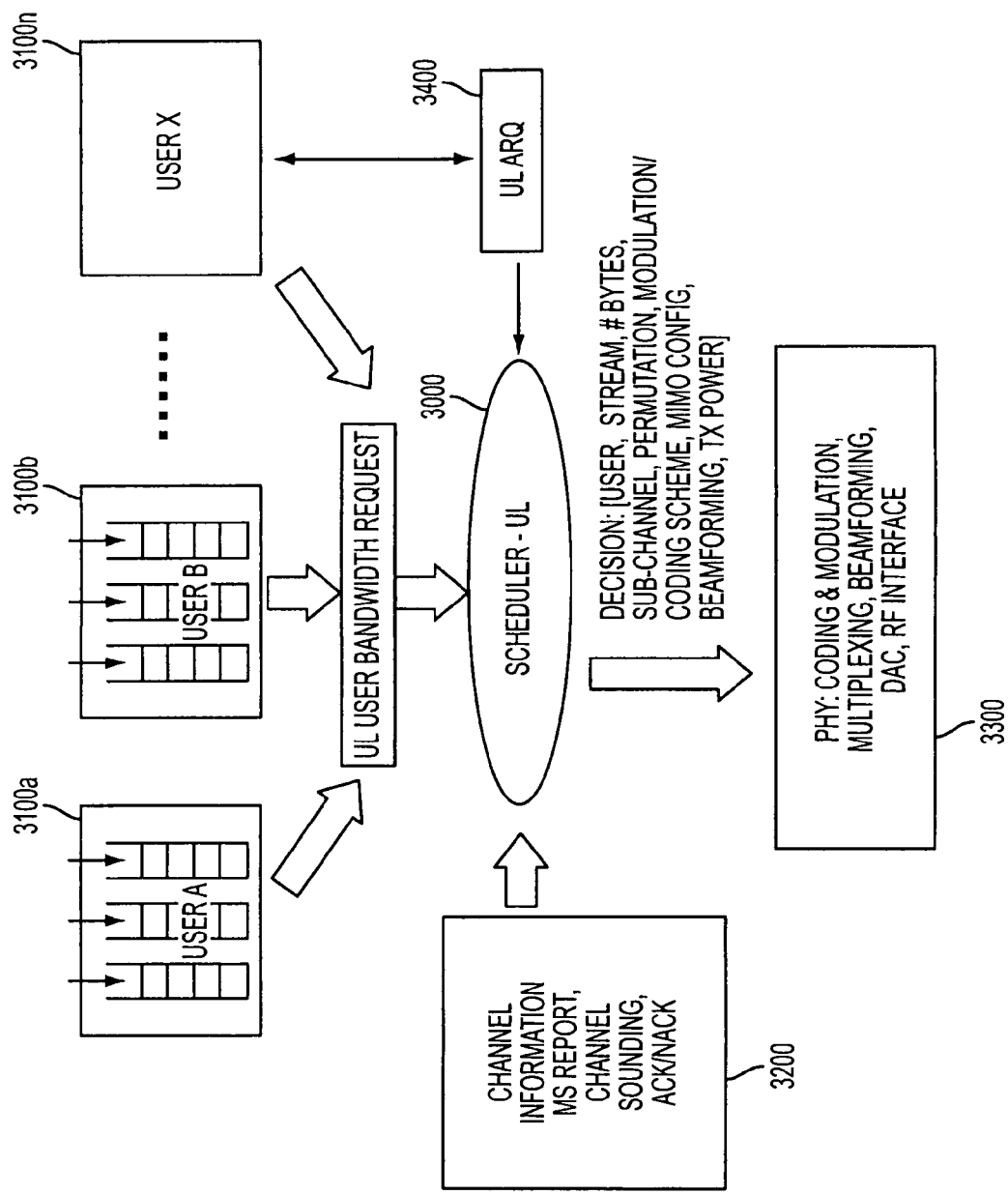
FIG. 9 is a functional block diagram illustrating the functioning of a scheduler during an uplink operation according to an embodiment of the present general inventive concept.

FIG. 9 is a block diagram illustrating the role of an uplink scheduler 3000. The scheduler 3000 receives users bandwidth and power requests from a plurality of users 3100a, 3100b, ..., 3100n, which includes information regarding users and channel information 3200. Similar to the downlink functioning, the scheduler 3000 decides for each user the stream, number of bytes, sub-channel, permutation, modulation/coding scheme, MIMO configuration, beam forming and power and communicates these decisions to the physical layer 3300. An uplink automatic repeat request (ULARQ) 3400 is connected to both the scheduler 2000 and each of the users 3100a, 3100b, ..., 3100n.

One benefit of the various embodiments of the scheduler is that the bandwidth and/or power allocation optimizes capacity under proportional fairness rules. The scheduler is computationally efficient and meets the realtime constraints in actual systems.

Another benefit is that such a scheduler can be used as part of the radio resource management in OFDMA-based base stations, such as planned for WiMAX (IEEE 802.16e). The scheduler has a significant impact on overall system performance.

The above embodiments may be implemented in software and/or computing hardware. For, example, the scheduler 252 can be implemented in the MAC layer of the base station 105. However, in other embodiments, the scheduler 252 can be implemented in two or more layers, for example, in the MAC layer and/or the physical layer. According to an aspect of the embodiments, the scheduler 252 operations may be implemented in any of the, or any portion thereof, layers 301, 302, 303, and/or 304. The base station 105 is any computing device, such as a computer including a controller.

The embodiments determine the optimal bandwidth and/or power allocation during downlink and/or uplink in a wireless OFDMA transmission system with relatively low complexity. Compared with other bandwidth/power allocation schemes, the embodiments increase the capacity of the system while maintaining fairness among different users, maximizing the proportional fair capacity of the system. Downlink refers to the transmission from a base station to the users. Uplink refers to the transmission from the users to the base station. In both the uplink and the downlink direction, the total bandwidth may be limited and has to be distributed (shared) by the plurality of users. In the downlink direction the total transmission power of the base station may be limited and has to be distributed to the users, so the summation of the power assigned to these users is no greater than a threshold (total transmission power of the base station). In the uplink direction, each user station may be subject to its own maximal transmission power limit. The limit on the total transmission power from multiple user stations connected to a base station may also apply, if the interference caused to adjacent base stations need to be controlled.

The present invention can also be embodied as computer-readable codes on a computer-readable medium executable by a computer. A computer-readable medium is any medium that can store data, which can be thereafter read by a computer system. Examples of computer-readable media include (without limitation) read-only memory (ROM), random-access memory (RAM). CD-ROMs, magnetic tapes, floppy disks, optical data storage devices. Transmission communication media includes carrier waves (such as wireless and/or wired data transmission, for example, through the Internet).

The many features and advantages of the invention are apparent from the detailed specification and, thus, it is intended by claims to cover all such features and advantages of the invention that fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. An apparatus scheduling a wireless transmission bandwidth and power to a plurality of users for each time-slot, comprising:
    a controller that executes:
        setting up equations for a continuous bandwidth allocation of a total bandwidth, or a continuous power distribution of a total power or both, by using Langragian multipliers to include constraints in a function that is maximum when a fair capacity is maximum, wherein the continuous bandwidth allocation and the continuous power distribution respectively represent sets of values corresponding to users that maximize the function,
        determining the continuous power distribution for a bandwidth allocation previously determined based upon the continuous bandwidth allocation of the total bandwidth, using a waterfilling method in a power functional domain, and/or determining the continuous bandwidth allocation for a power distribution previously determined based upon the continuous power distribution of the total power, using a waterfilling method in a bandwidth functional domain, and
        converting the continuous bandwidth allocation or the continuous power distribution or both to a discrete bandwidth allocation or a discrete power distribution, or both, respectively.

2. The apparatus according to claim 1, wherein the continuous bandwidth allocation and the continuous power distribution are calculated iteratively until a difference between proportional fair capacities corresponding to sequential calculations becomes less than a predetermined number and/or a predetermined maximal number of iterations is reached.

3. The apparatus according to claim 1, wherein the controller performs the converting according to a subchannel width, a number of available subchannels, and available modulation and coding schemes or any combinations thereof.

4. The apparatus according to claim 1, wherein the waterfilling method uses a pre-computed look-up table.

5. The apparatus according to claim 1, wherein the continuous bandwidth allocation or the continuous power distribution is determined using the Langragian multipliers and waterfilling method with a pre-computed look-up table, and whichever of the continuous bandwidth allocation or the continuous power distribution not determined using the pre-computed look-up table is determined by scaling.

6. The apparatus according to claim 1, wherein the controller converts the continuous bandwidth allocation to the discrete bandwidth allocation of subchannels by assigning to each user a number of subchannels representing a larger between 1 and a result of applying a floor operator to a number of subchannels allocated to the user according to the continuous bandwidth allocation.

7. The apparatus according to claim 6, wherein remaining subchannels that are not yet allocated after the assigning, are distributed to the users by adding one subchannel to each user starting from the user with best subchannel quality in descending order.

8. The apparatus according to claim 1, wherein the controller drops some users if when converting the continuous bandwidth allocation to the discrete bandwidth allocation, a number of users having a single subchannel is larger than a predetermined number.

9. The apparatus according to claim 1, wherein the continuous power distribution is converted into the discrete power distribution after the continuous bandwidth allocation is converted into the discrete bandwidth allocation.

10. A method of determining a discrete bandwidth allocation and a discrete power distribution for a plurality of users by a scheduler including a CPU, comprising:
    setting up equations for a continuous bandwidth allocation of a total bandwidth, or a continuous power distribution of a total power, or both, using Langragian multipliers to include constraints in a function that is maximum when a fair capacity is maximum,
    determining by the scheduler the continuous power distribution for a bandwidth allocation previously determined based upon the continuous bandwidth allocation of the total bandwidth, using a waterfilling method in a power functional domain, and/or determining by the scheduler the continuous bandwidth allocation is calculated for a power distribution previously determined based upon the continuous power distribution of the total power, using a waterfilling method in a bandwidth functional domain; and
    converting by the scheduler the continuous bandwidth allocation or the continuous power distribution or both, to the discrete bandwidth allocation or the discrete power distribution, or both, respectively.

11. The method according to claim 10, wherein the continuous bandwidth allocation and the continuous power distribution are determined iteratively until
    a difference between proportional fair capacities corresponding to sequential calculations becomes less than a predetermined number or
    a predetermined maximal number of iterations is reached.

12. The method according to claim 11, wherein the equations are solved using waterfilling methods with pre-computed look-up tables.

13. The method according to claim 10, wherein the converting is performed according to a subchannel width, a number of available subchannels, and modulation and coding schemes, and any combinations thereof.

14. The method according to claim 10, wherein the equations corresponding to the continuous bandwidth allocation or the equations corresponding to the continuous power distribution are solved with look-up tables, and whichever of the equations corresponding to the continuous bandwidth allocation or the equations corresponding to the continuous power distribution not solved using the look-up tables are solved by scaling.

15. The method according to claim 10, wherein the continuous bandwidth allocation is converted to the discrete bandwidth allocation by allocating to each user a number of subchannels representing a larger between 1 and a result of applying a floor operator to a value from the respective continuous bandwidth allocation corresponding to the user.

16. The method according to claim 10, wherein remaining subchannels are distributed to the users by adding one channel to each user starting from the user with best subchannel quality in descending order.

17. The method according to claim 10, wherein some users are dropped if a number of users having a single subchannel is larger than a predetermined number.

18. The method according to claim 10, wherein the continuous power distribution is converted into the discrete power distribution after the continuous bandwidth allocation is converted into the discrete bandwidth allocation.

19. A non-transitory computer readable media storing executable codes which when executed on a computer cause the computer to perform a method of determining a discrete bandwidth allocation and a discrete power distribution, comprising:
setting up equations for a continuous bandwidth allocation of a total bandwidth, or a continuous power distribution of a total power, or both, using Langragian multipliers to include constraints in a function that is maximum when a fair capacity is maximum;
determining the continuous power distribution for a bandwidth allocation previously determined based upon the continuous bandwidth allocation of the total bandwidth, using a waterfilling method in a power functional domain, and/or determining the continuous bandwidth allocation for a power distribution previously determined based upon the continuous power distribution of the total power, using a waterfilling method in a bandwidth functional domain; and
converting the continuous bandwidth allocation or the continuous power distribution or both, to the discrete bandwidth allocation or the discrete power distribution, or both, respectively.

20. The computer readable media according to claim 19, wherein the continuous bandwidth allocation and the continuous power distribution are determined iteratively until a difference between proportional fair capacities corresponding to sequential calculations becomes less than a predetermined number or a predetermined maximal number of iterations is reached.

21. The computer readable media according to claim 19, wherein the converting is performed according to a subchannel width, a number of available subchannels, and modulation and coding schemes, and any combinations thereof.

22. The computer readable media according to claim 19, wherein the equations are solved using waterfilling methods with pre-computed look-up tables.

23. The computer readable media according to claim 19, wherein the equations corresponding to the continuous bandwidth allocation or the equations corresponding to the continuous power distribution are solved with look-up tables, and whichever of the equations corresponding to the continuous bandwidth allocation or the equations corresponding to the continuous power distribution not solved using the look-up tables are solved by scaling.

24. The computer readable media according to claim 19, wherein the continuous bandwidth allocation is converted to the discrete bandwidth allocation by allocating to each user a number of subchannels representing a larger between 1 and a result of applying a floor operator to a value from the continuous bandwidth allocation corresponding to the user.

25. The computer readable media according to claim 19, wherein remaining subchannels are distributed to the users by adding one channel to each user starting from the user with best subchannel quality in descending order.

26. The computer readable media according to claim 19, wherein some users are dropped if the number of users having a single channel is larger than a predetermined number.

27. The computer readable media according to claim 19, wherein the continuous power distribution converted into the discrete power distribution after the continuous bandwidth allocation is converted into the discrete bandwidth allocation.

* * * * *

UNITED STATES PATENT AND TRADEMARK OFFICE
CERTIFICATE OF CORRECTION

| | | |
|---|---|---|
| PATENT NO. | : 7,924,698 B2 | Page 1 of 1 |
| APPLICATION NO. | : 11/785893 | |
| DATED | : April 12, 2011 | |
| INVENTOR(S) | : Chenxi Zhu et al. | |

It is certified that error appears in the above-identified patent and that said Letters Patent is hereby corrected as shown below:

Column 16, Line 34, In Claim 10, delete "maximum," and insert --maximum;--, therefor.

Column 16, Line 40, In Claim 10, delete "is calculated for" and insert --for--, therefor.

Signed and Sealed this
Eighteenth Day of October, 2011

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,924,698 B2 | |
| APPLICATION NO. | : 11/785893 | |
| DATED | : April 12, 2011 | |
| INVENTOR(S) | : Chenxi Zhu et al. | |

It is certified that error appears in the above-identified patent and that said Letters Patent is hereby corrected as shown below:

Column 15, Line 33, In Claim 1, delete "Langragian" and insert --Lagrangian--, therefor.

Column 15, Line 67, In Claim 5, delete "Langragian" and insert --Lagrangian--, therefor.

Column 16, Line 32, In Claim 10, delete "Langragian" and insert --Lagrangian--, therefor.

Column 17, Line 27, In Claim 19, delete "Langragian" and insert --Lagrangian--, therefor.

Signed and Sealed this
Tenth Day of January, 2012

David J. Kappos
*Director of the United States Patent and Trademark Office*